United States Patent
Nakamura et al.

(10) Patent No.: US 9,410,645 B2
(45) Date of Patent: *Aug. 9, 2016

(54) MULTILAYER TUBE FOR TRANSPORTATION

(75) Inventors: Ken Nakamura, Ube (JP); Tsuyoshi Kubo, Ube (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/394,394

(22) PCT Filed: Sep. 3, 2010

(86) PCT No.: PCT/JP2010/065150
§ 371 (c)(1),
(2), (4) Date: Mar. 6, 2012

(87) PCT Pub. No.: WO2011/027863
PCT Pub. Date: Mar. 10, 2011

(65) Prior Publication Data
US 2012/0168020 A1    Jul. 5, 2012

(30) Foreign Application Priority Data
Sep. 7, 2009    (JP) .................. 2009-205450

(51) Int. Cl.
*B32B 1/08* (2006.01)
*F16L 11/127* (2006.01)
(Continued)

(52) U.S. Cl.
CPC .................. *F16L 11/127* (2013.01); *B32B 1/08* (2013.01); *B32B 27/08* (2013.01); *B32B 27/18* (2013.01);
(Continued)

(58) Field of Classification Search
CPC .......... B32B 1/08; B32B 27/18; B32B 27/20; B32B 2262/106; B32B 2307/202; F16L 11/18; F16L 11/127

USPC ..................................... 423/445 R; 428/36.9
See application file for complete search history.

(56) References Cited

U.S. PATENT DOCUMENTS 4,971,726 A    11/1990 Maeno et al.
5,643,990 A    7/1997 Uehara et al.
(Continued)

FOREIGN PATENT DOCUMENTS

EP    1 300 364 A2    4/2003
EP    1 637 563 A1    3/2006
(Continued)

OTHER PUBLICATIONS

Lin et al. entitled "Dynamical Observation of Bamboo-like Carbon Nanotube Growth", Nano Letters, vol. 7, No. 8, p. 2234-2238, 2007.*
(Continued)

*Primary Examiner* — Yan Lan
(74) *Attorney, Agent, or Firm* — Nixon Peabody LLP; Jeffrey L. Costellia

(57) ABSTRACT

There is provided a multilayer tube for transporting a fuel, a chemical liquid or a gas, which is based on a thermoplastic resin, in particular a polyamide resin, wherein its inner layer comprises an electroconductive thermoplastic resin in which a fine carbon fiber has been blended as an agent imparting an electroconductivity, and it excels in a molding processability, a fuel oil resistance and an antistatic property. This multilayer tube comprises at least two layers of (a) an outer layer comprising a thermoplastic resin, and (b) an inner layer comprising an electroconductive thermoplastic resin so that a surface resistivity is not more than $10^8$ Ω; the electroconductive thermoplastic resin comprising a fine carbon fiber, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber.

8 Claims, 4 Drawing Sheets

(51) Int. Cl.

| | | |
|---|---|---|
| *B32B 27/34* | (2006.01) | |
| *B32B 27/08* | (2006.01) | |
| *B32B 27/18* | (2006.01) | |
| *B32B 27/20* | (2006.01) | |
| *B32B 27/32* | (2006.01) | |
| *F16L 11/18* | (2006.01) | |

(52) U.S. Cl.
CPC .............. *B32B 27/20* (2013.01); *B32B 27/32* (2013.01); *B32B 27/34* (2013.01); *F16L 11/18* (2013.01); *B32B 2250/24* (2013.01); *B32B 2262/106* (2013.01); *B32B 2307/202* (2013.01); *B32B 2597/00* (2013.01)
USPC ........................................ 428/36.9; 138/137

(56) References Cited

U.S. PATENT DOCUMENTS

| | | | |
|---|---|---|---|
| 7,026,432 | B2 | 4/2006 | Charati et al. |
| 2003/0044615 | A1 | 3/2003 | Yanagisawa et al. |
| 2003/0086859 | A1 | 5/2003 | Kawakami et al. |
| 2004/0005269 | A1 | 1/2004 | Huang et al. |
| 2004/0258606 | A1 | 12/2004 | Yamamoto et al. |
| 2006/0239897 | A1 | 10/2006 | Moy et al. |
| 2007/0148389 | A1* | 6/2007 | Nishioka et al. ............ 428/36.91 |
| 2009/0035569 | A1 | 2/2009 | Gonzalez Moral et al. |
| 2010/0113259 | A1 | 5/2010 | Ma et al. |
| 2010/0113737 | A1 | 5/2010 | Okushita et al. |
| 2010/0119949 | A1 | 5/2010 | Yano et al. |
| 2010/0230641 | A1 | 9/2010 | Oki et al. |
| 2011/0003151 | A1* | 1/2011 | Nishio et al. .................. 428/367 |

FOREIGN PATENT DOCUMENTS

| | | | |
|---|---|---|---|
| EP | 2096133 A1 * | 9/2009 | |
| EP | 2 131 422 A1 | 12/2009 | |
| EP | 2 251 465 A1 | 11/2010 | |
| JP | S64-011161 | 1/1989 | |
| JP | H01-131251 | 5/1989 | |
| JP | H02-235945 | 9/1990 | |
| JP | H03-74465 | 3/1991 | |
| JP | H07-286103 | 10/1995 | |
| JP | 08025578 A * | 1/1996 | |
| JP | 2001-310994 | 11/2001 | |
| JP | 2003-206117 | 7/2003 | |
| JP | 2003-221217 | 8/2003 | |
| JP | 2003-227039 | 8/2003 | |
| JP | 2004-230926 | 8/2004 | |
| JP | 2004-231745 | 8/2004 | |
| JP | 2004-299986 | 10/2004 | |
| JP | 2004-303613 | 10/2004 | |
| JP | 2004-323738 | 11/2004 | |
| JP | 2005-512925 | 5/2005 | |
| JP | 2005-331101 | 12/2005 | |
| JP | 2006-103996 | 4/2006 | |
| JP | 2006-306960 | 11/2006 | |
| JP | 2007-169561 | 7/2007 | |
| JP | 2007-231219 | 9/2007 | |
| JP | 2008-535763 | 9/2008 | |
| JP | 2008-230947 | 10/2008 | |
| JP | 2008-270204 | 11/2008 | |
| JP | 2008-277128 | 11/2008 | |
| JP | 2009-272041 | 11/2009 | |
| JP | 2010-031214 | 2/2010 | |
| KR | 2009-0016734 | 2/2009 | |
| WO | WO 87/07559 | 12/1987 | |
| WO | WO 90/10296 | 9/1990 | |
| WO | WO 02/095097 A1 | 11/2002 | |
| WO | WO 03/050333 A1 | 6/2003 | |
| WO | WO-2006/108683 | 10/2006 | |
| WO | WO 2008/123531 A1 | 10/2008 | |
| WO | WO 2009/110570 A1 | 9/2009 | |
| WO | WO 2009110570 A1 * | 9/2009 | |

OTHER PUBLICATIONS

Third Party Observation filed on Oct. 7, 2011 in a Japanese Patent Application No. JP 2010-501963.
Third Party Observation filed on Jun. 21, 2011 in a Japanese Patent Application No. JP 2009-086198.
Third Party Observation filed on Jan. 17, 2012 in a European Patent Application No. EP 09716952.8.
International Preliminary Report on Patentability (Chapter 1) dated Apr. 19, 2012 and Written Opinion dated Nov. 16, 2010 in International Application No. PCT/JP2010/065150.
International Search Report in International Application No. PCT/JP2010/065150.
Endo, "Basic of Carbon Nanotube and Frontier of Industrialization of Carbon Nanotube," Jan. 11, 2002, pp. 246-249.
Audier, "Morphology and Crystalline Order in Catalytic Carbons," Carbon, 1981, vol. 19, pp. 217-224.
Inagaki (editor), "Commentary on Carbon Family," Oct. 30, 2001, pp. 90-91.
Katayama, "Inorganic Material Science for Engineering," Apr. 10, 2006, p. 29.
Experimental Chemistry Course 28, "Chemistry of Nanotechnology," 5th edition, Chemical Society of Japan, Jul. 30, 2005, p. 34.
"Experimental Technology on Latest Carbon Materials (Book on Analysis)," Carbon Society of Japan, Nov. 30, 2001, p. 157.
Supplementary European Search Report dated Jul. 6, 2012 issued in European Patent Application No. 10758860.0 by European Patent Office.
J.P. Pinheiro, et al., Nanotubes and nanofilaments from carbon monoxide disproportionation over Co/MgO catalysts I. Growth versus catalyst state; Carbon 41 (2003), pp. 2949-2959.
N. Pierard. et al., "Production of short carbon nanotubes with open tips by ball milling"; Chemical Physics Letters, 335 (2001), pp. 1-8.
E. Flahaut, et al., "Gram-scale CCVD synthesis of double-walled carbon nanotubes"; ChemComm, 2003, pp. 1442-1443.
U.S. Office Action dated Dec. 7, 2012 issued in U.S. Appl. No. 12/920,769.
Third Party Observation filed Jun. 22, 2012 in Japan Patent Office against Japanese Patent Application. No. 2011-237863.
Supplementary European Search Report dated Jun. 7, 2012 issued in European Patent Application No. 10758860.0 by European Patent Office.
Final Office Action dated Jun. 21, 2013 issued in a U.S. Appl. No. 12/920,769.
Extended European Search Report dated May 24, 2013 issued in an European Pat. App. No. 09 71 6952.8.
Y.A. Kim et al., "Effect of ball milling on morphology of cup-stacked carbon nanotubes"; Chemical Physics Letters, vol. 355, Apr. 2, 2002, pp. 279-284.
J.M. Feng et al., "Controlled growth of high quality bamboo carbon nanotube arrays by the double injection chemical vapor deposition process"; Materials Science & Engineering A, vol. 473, (2008), pp. 238-243.
L.Y. Heng et al., "Demonstration of the advantages of using bamboo-like nanotubes for electrochemical biosensor applications compared with single walled carbon nanotubes"; Electrochemistry Communications, vol. 7, (2005), pp. 1457-1462.
Y. Lu et al., "Formation of bamboo-shape carbon nanotubes by controlled rapid decomposition of picric acid"; Carbon, vol. 42, (2004), pp. 3199-3207.
E. Flahaut et al., "CCVD synthesis of carbon nanotubes from (Mg,Co, Mo)O catalysts: influence of the proportions of cobalt and molybdenum"; Journal of Materials Chemistry, vol. 14, (2004), pp. 646-653.
Non-Final Office Action dated May 8, 2014 issued in a U.S. Appl. No. 13/381,118.
M. Lin et al., "Dynamical Observation of Bamboo-like Carbon Nanotube Growth", Nano Letters, Jun. 30, 2007, vol. 7, No. 8, pp. 2234-2238.
Non-Final Office Action dated Aug. 27, 2014 issued in a U.S. Appl. No. 13/389,015.

(56) References Cited

OTHER PUBLICATIONS

Non-Final Office Action dated Aug. 27, 2014 issued in a U.S. Appl. No. 13/389,017.
H. Okuno et al., "Synthesis of carbon nanotubes and nano-necklaces by thermal plasma process", Carbon, Jul. 2, 2004, vol. 42, pp. 2543-2549.
Extended European Search Report issued Jan. 7, 2015 in an European Patent Application No. 10806535.0.
U.S. Office Action (U.S. Appl. No. 14/338,129) dated Jan. 16, 2015.
U.S. Office Action (U.S. Appl. No. 13/260,673) Dated Apr. 1, 2015.
Wei C. et al "Nanomechanics of Carbon Nanofibers: Structural and Elastic Properties", May 26, 2004, pp. 1-8, NASA Ames Research Center.
U.S Office Action (U.S. Appl. No. 13/262,150) Dated May 21, 2015.
Korean Office Action (Korean Patent Application No. 2011-7025559) dated Feb. 16, 2016.
Wang, X. et al., "Preparation of Short Carbon Nanotubes and Application as an Electrode Material in Li-Ion Batteries", Advanced Functional Materials, vol. 17, 2007, pp. 3613-3618.
Summons to attend oral proceedings (European Patent Application No. 09716952.8) Dated Mar. 31, 2016.

* cited by examiner (a)

(b)

(a)  (b)

MULTILAYER TUBE FOR TRANSPORTATION

TECHNICAL FIELD

The present invention relates to a multilayer tube for transporting a fuel, a chemical liquid or a gas, which is based on a thermoplastic resin, in particular a polyamide resin, wherein its inner layer comprises an electroconductive thermoplastic resin in which a fine carbon fiber has been blended as an agent imparting an electroconductivity, and it excels in a molding processability, a fuel oil resistance and an antistatic property.

BACKGROUND ART

From the viewpoint of safety and environmental protection, a mechanical property such as a strength and a flexibility, and a barrier property are required for a tube for transporting a fuel, a chemical liquid or a gas. In order to prevent an accumulation of static electricity caused by a friction with an inner wall of a tube and a discharge (ignition) during transport and to prevent a fuel, a chemical liquid or a gas from inflaming, a tube is used in which an electroconductivity has been imparted to the inner layer in contact with them.

As a method for imparting an electroconductivity to a resin, it is well known to knead and disperse an electroconductive filler to give an electroconductive resin. As an electroconductive filler to be kneaded into a resin, an ionic electroconductive organic surfactant, a metal fiber and powder, an electroconductive metal oxide powder, a carbon black, a carbon fiber, a graphite powder and the like are generally utilized, and a molded article having a volume resistance value of $10^{-1}$ to $10^{12}$ Ω·cm can be obtained by molding and processing an electroconductive resin composition wherein these fillers have been melted, kneaded and dispersed into a resin.

In particular, a method of adding a carbonaceous material into a resin is the most common (Patent document 1: JP-A-H07-286103 and Patent document 2: JP-A-H01-11161), and it is also known to blend an electroconductive carbon black in a thermoplastic resin including polyamide.

Although however, blending a carbon black including the Ketjen Black (the registered trademark by the Ketjen Black International Co.) and an acetylene black in 15% by mass or less allows for a high electroconductivity, these are difficult to control a dispersion into a resin and a especial formulation and mixing technologies are required to obtain a stable electroconductivity. Even if a sufficient electroconductivity is obtained, not only a processability extremely degrades but also the physical properties of an electroconductive resin composition such as a tensile strength, a flexural strength and an impact resistance strength also extremely degrade in comparison with the physical properties of an original resin free from an electroconductive filler.

Although there is also an electroconductive filler with a high aspect ratio such as a graphite powder in a flake form and a carbon fiber in a whisker form apart from a carbon black, amount of exceeding 15% by mass is required to exhibit an electroconductivity, which degrades the original properties of a resin and inhibits a moldability and electroconductivity with the emergence of deviation and orientation of fibers upon obtaining a molded article with a complex shape. There is also a problem in that carbon particles and carbon fibers readily slough away from the surface of a molded article (sloughy).

When the carbon fibers with different fiber diameters are blended in the same amount of mass, the fiber with the smaller fiber diameter is more excellent in imparting an electroconductivity because an electroconductive circuit network among fibers is easy to form. A hollow extra-fine carbon fiber, the so-called carbon nanotube has been recently disclosed, which has a fiber diameter smaller in two to three digits than that of conventional carbon fibers, and it has been also proposed to blend it into various resins, rubbers and the like as an electroconductive filler (Patent document 3: JP-A-H01-131251, Patent document 4: JP-A-H03-74465, Patent document 5: JP-A-H02-235945), which is regarded as an effective electroconductive filler solving the defects of the conventional electroconductive fillers.

These so-called ultrafine carbon fibers collectively called as carbon nanofiber or carbon nanotube can be generally categorized into the following three nanostructured carbon materials based on their shapes, configurations and structures:

(1) Multilayer Carbon Nanotube (Multilayer Concentric Cylindrical Graphite Layer)(Non-Fishbone Type);
   Japanese publication of examined application Nos. H03-64606 and H03-77288
   Japanese Laid-Open publication No. 2004-299986
(2) Cup Stack Type Carbon Nanotube (Fishbone Type);
   U.S. Pat. No. 4,855,091
   M. Endo, Y. A. Kim etc.: Appl. Phys. Lett., vol 80 (2002) 1267 et seq.
   Japanese Laid-Open publication No. 2003-073928
   Japanese Laid-Open publication No. 2004-360099
(3) Platelet Type Carbon Nanofiber (Card Type)
   H. Murayama, T. maeda,: Nature, vol 345 [No.28] (1990) 791 to 793
   Japanese Laid-Open publication No. 2004-300631.

In a (1) multilayer carbon nanotube, conductivity in a longitudinal direction of the carbon nanotube is high because electron flow in a graphite network plane direction contributes to conductivity in a longitudinal direction. On the other hand, for inter-carbon-nanotube conductivity, electron flow is perpendicular to a graphite network plane direction and is generated by direct contact between fibers, but it is believed that within a resin, since inter-fiber contact is not so contributive, electron flow by electrons emitted from the surface layer of a conductive filler plays more important role than electron flow in fibers. Ease of electron emission involves conductivity performance of a filler. It is supposed that in a carbon nanotube, a graphite network plane is cylindrically closed and jumping effect (tunnel effect hypothesis) by π-electron emission little occurs.

In an ultrafine carbon fiber having a (2) fishbone or (3) card type structure, an open end of a graphite network plane is exposed in a side peripheral surface, so that conductivity between adjacent fibers is improved in comparison with a carbon nanotube. However, since the fiber has a piling structure in which C-axis of a graphite network plane is inclined or orthogonal to a fiber axis, conductivity in a longitudinal fiber-axis direction in a single fiber is reduced, resulting in reduced conductivity as the whole composition.

The so-called carbon nanotubes described above are not satisfactory because they are difficult to be uniformly dispersed in a resin and the undispersed portion of carbon nanotubes is remained as an aggregate in a resin, which causes problems such as unspinnability (broken thread), filter occlusion at the discharge part of a molding machine, deterioration in the mechanical strengths such as the impact resistance of a molded article and deterioration of its surface appearance. For this reason, blending and mixing the especial compositions and the particular surface modification treatments are needed, for example, optimization of resin molecular weight (Patent document 6: JP-A-2001-310994), blending with modified resin, elastomer and compatibilizing agent (Patent document 7: JP-A-2007-231219, Patent document 8: JP-A-2004-230926, Patent document 9: JP-A-2007-169561, Patent document 10: JP-A-2004-231745) and surface modification treatment of carbon nanotube (Patent document 11: JP-A-2004-323738), and there is a problem that the kind, composition and the like of resins are to be restricted, thus, further improvements are demanded.

PATENT DOCUMENTS

Patent document 1: JP-A-H07-286103
Patent document 2: JP-A-H01-11161
Patent document 3: JP-A-H01-131251
Patent document 4: JP-A-H03-74465
Patent document 5: JP-A-H02-235945
Patent document 6: JP-A-2001-310994
Patent document 7: JP-A-2007-231219
Patent document 8: JP-A-2004-230926
Patent document 9: JP-A-2007-169561
Patent document 10: JP-A-2004-231745
Patent document 11: JP-A-2004-323738

SUMMARY OF INVENTION

Problem to be Solved by the Invention

The objective of the present invention is to provide a tube for transporting a fuel, a chemical liquid or a gas, wherein its inner layer comprises a thermoplastic resin having an excellent molding processability and mechanical property, and a stable electroconductivity.

Means for Solving Problem

The present invention relates to the following terms.
1. A multilayer tube for transporting a fuel, a chemical liquid or a gas, the multilayer tube comprising at least two layers of
    (a) an outer layer comprising a thermoplastic resin, and
    (b) an inner layer comprising an electroconductive thermoplastic resin so that a surface resistivity is not more than $10^8$ Ω; the electroconductive thermoplastic resin comprising a fine carbon fiber, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber.
2. The multilayer tube for transporting a fuel, a chemical liquid or a gas according to the above item 1, wherein the fine carbon fiber is produced by vapor phase growth using a catalyst containing an element selected from the group consisting of Fe, Co, Ni, Al, Mg and Si, and an ash content in the fine carbon fiber is 4% by weight or less.
3. The multilayer tube for transporting a fuel, a chemical liquid or a gas according to the above item 1 or 2, wherein the fine carbon fiber is a fine short carbon fiber in which 100 or less of the aggregates are connected.
4. The multilayer tube for transporting a fuel, a chemical liquid or a gas according to any one of the above items 1-3, wherein the fine short carbon fibers are produced by fiber shortening by applying shear stress.
5. The multilayer tube for transporting a fuel, a chemical liquid or a gas according to any one of the above items 1 to 4, wherein the thermoplastic resin constituting the outer layer is a polyamide.
6. The multilayer tube for transporting a fuel, a chemical liquid or a gas according to any one of the above items 1 to 5, wherein the electroconductive thermoplastic resin constituting the inner layer is an electroconductive polyamide.
7. The multilayer tube for transporting a fuel, a chemical liquid or a gas according to any one of the above items 1 to 6, wherein the electroconductive thermoplastic resin constituting the inner layer is an electroconductive polyamide resin comprising a polyamide obtained from a dicarboxylic acid component comprising oxalic acid and a diamine component comprising a diamine having 4 to 12 carbon atoms.
8. The multilayer tube for transporting a fuel, a chemical liquid or a gas according to any one of the above items 1 to 7, wherein the electroconductive thermoplastic resin constituting the inner layer is a polyamide resin obtained by using a diamine component consisting substantively of 1,9-nonanediamine and 2-methyl-1,8-octanediamine, in which a molar ratio of 1,9-nonanediamine and 2-methyl-1,8-octanediamine is from 1:99 to 99:1.

Effect of the Invention

In accordance with the present invention, a multilayer tube for transporting a fuel, a chemical liquid or a gas is obtained, wherein its inner layer comprises a resin composition having a stable electroconductivity while upholding the original property and moldability that the thermoplastic resin has. The inner layer of the electroconductive thermoplastic resin being the constituent of the present invention achieves a high electroconductivity by the addition of a small amount of a fine carbon fiber. For this reason, a tube for transporting a fuel can be obtained without a large deterioration in the original property of a resin such as, for example, its moldability and mechanical property.

Furthermore, in the multilayer tube of the present invention, the electroconductivity of the inner layer does not degrade even upon absorbing a fuel and chemical liquid, in particular a fuel containing an alcohol.

MODE FOR CARRYING OUT THE INVENTION

Figure 1:
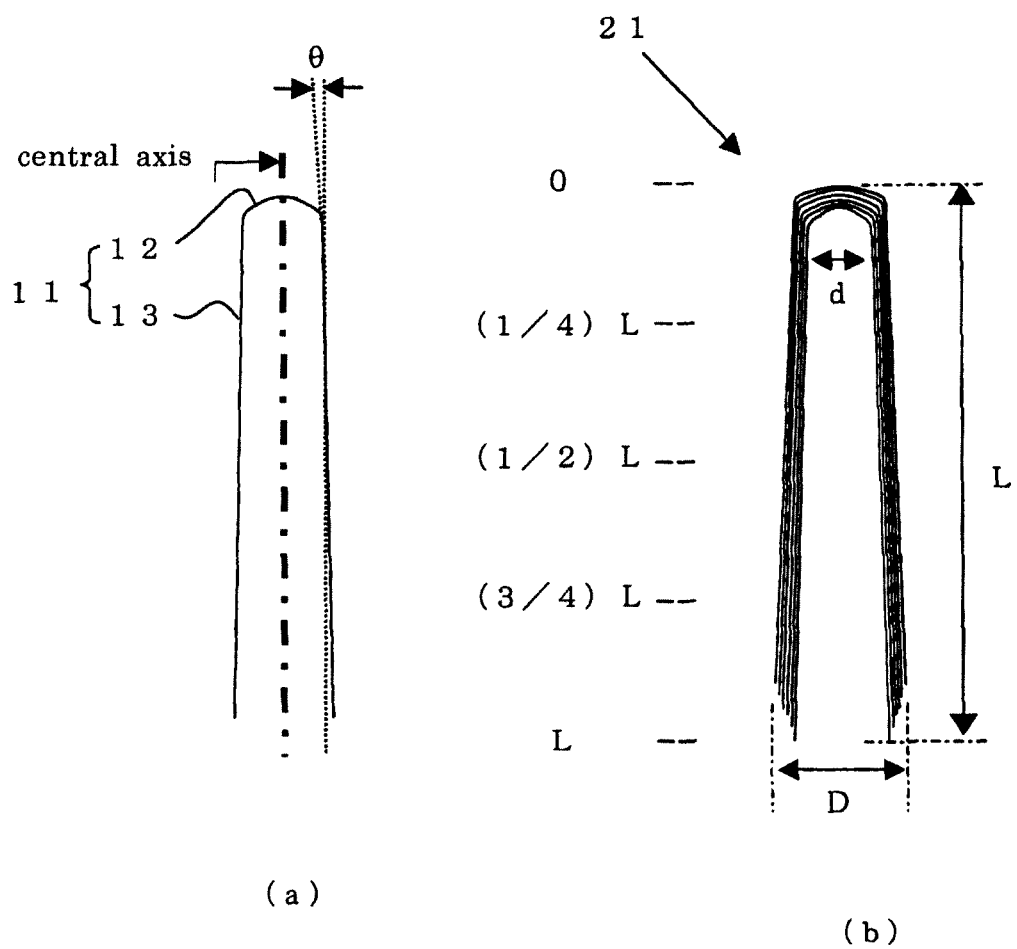
FIG. 1(a) is a drawing schematically showing a minimal structural unit (temple-bell-shaped structural unit) constituting a fine carbon fiber.
FIG. 1(b) is a drawing schematically showing an aggregate consisting of 2 to 30 stacked temple-bell-shaped structural units.

There will be detailed the present invention. Herein, "fine short carbon fiber" is a concept embraced by "fine carbon fiber", and refers to a short-fiber having a shorter fiber length among "fine carbon fibers" as described later. In the following description, "fine carbon fiber" generally means "fine carbon fiber which is not shortened". Unless otherwise indicated, "fine carbon fiber" and "fine short carbon fiber" denote a carbon fiber having a particular structure described below, and does not mean a carbon fiber having a known structure.

In the present invention also, the "inner layer" of the multilayer tube denotes the innermost layer in direct contact with a fuel, a chemical liquid, a gas and the like to be transported, and the "outer layer" denoted a layer other than the inner layer, which is formed on the outer side of the inner layer.

<<Multilayer Tube>>

The multilayer tube of the present invention has at least two layers consisting of the outer layer comprising a thermoplastic resin and the inner layer comprising an electroconductive thermoplastic resin while the number of the entire layers is not particularly limited. The multilayer tube of the present invention may also have one or two or more layers formed from another thermoplastic resin in order to impart a further function or to obtain a multilayer tube advantageous economically.

The multilayer tube of the present invention is characterized in that at least the inner layer thereof comprises the electroconductive thermoplastic resin composition wherein the fine carbon fiber (including the fine short carbon fiber) has been dispersed. In the electroconductive thermoplastic resin composition to be used for the inner layer of the multilayer tube of the present invention, the blending amount of the fine carbon fiber (including the fine short carbon fiber) can be varied in a wider range compared with that of the "conventional ultrafine carbon fibers" due to the excellent dispersibility thereof as described later. The blending amount of the fine carbon fiber can be controlled within a range of obtaining an intended electroconductivity so that, for example, a surface resistivity of the inner layer becomes not more than $10^8$ $\Omega$ and more preferably not more than $10^5$ $\Omega$. The amount can also arbitrarily be altered within a range which does not cause a degradation of a moldability or a degradation of mechanical properties of a molded article. Generally, the blending amount is 0.1 to 40% by mass, more preferably 0.5 to 20% by mass and more preferably 1 to 15% by mass relative to the total mass of the composition.

The following advantages are obtained in the electroconductive thermoplastic resin composition to be used for the inner layer of the multilayer tube of the present invention by blending the fine carbon fiber (including the fine short carbon fiber) with the thermoplastic resin. Upon molding process, a processability is improved, and a deformation and shrinkage are suppressed. The excellent dispersibility of the fine carbon fiber prevents the static electrification when being in contact with a fuel or a chemical liquid and expresses the excellent impact resistance in a use environment at a low temperature.

The multilayer tube of the present invention may have a waved region. The waved region is a region formed into a waved shape, a cornice shape, accordion shape, a corrugated shape or the like. The multilayer tube may have the waved region not only over the entire length of the tube but also at an arbitrarily partial region within the tube. The waved region can be readily formed by that a straight tubular tube is initially formed, which is subsequently formed with a mold into a waved shape predetermined. The possession of such waved region allows for shock absorption and facilitates affixing. Furthermore, a necessary part can be added and a shape of L-letter, U-letter or the like can be made by a bending process.

Since the multilayer tube of the present invention is excellent in preventing the permeation of a fuel, a chemical liquid, a gas or the like, it is useful, for example, as a tube for transporting a fuel, a chemical liquid or a gas. It is also useful as a tube for transporting a fuel, a chemical liquid, a gas and the like having a high temperature because it is excellent in a heat resistance. Here, the transportation of a fuel, a chemical liquid or a gas having a high temperature in the present invention intends flowing and circulating of the fuel, the chemical liquid and the gas in a state not less than 50° C. in the multilayer tube instantaneously or continuously as being at not less than the temperature.

The fuel and the chemical liquid includes, for example, an aromatic hydrocarbon-based solvent such as benzene, toluene and xylene, an alcohol and phenol-based solvent such as methanol, ethanol, propanol, butanol, pentanol, ethylene glycol, propylene glycol, diethylene glycol, phenol, cresol, polyethylene glycol and polypropylene glycol, an ether-based solvent such as dimethyl ether, dipropyl ether, methyl-t-butyl ether, dioxane and tetrahydrofuran, a halogen-based solvent such as chloroform, methylene chloride, trichloroethylene, ethylene dichloride, perchloroethylene, monochloroethane, dichloroethane, tetrachloroethane, perchloroethane and chlorobenzene, a ketone-based solvent such as acetone, methyl ethyl ketone, diethyl ketone and acetophenone, a urea solution, gasoline, kerosene, diesel gasoline, an alcohol-containing gasoline, an oxygen-containing gasoline, an amine-containing gasoline, sour gasoline, a ricinus-based brake liquid, a glycol ether-based brake liquid, a borate ester-based brake liquid, a brake liquid for frigid areas, a silicone oil-based brake liquid, a mineral oil-based brake liquid, a power steering oil, a hydrogen sulfide-containing oil, an engine coolant, a window washer liquid, a pharmaceutical, an ink, a paint and the like. In the present invention, the chemical liquid of the present invention shall also embrace an aqueous solution comprising the chemical liquid of the exemplification described above as a constituent.

The gas includes Freon-11, Freon-12, Freon-21, Freon-22, Freon-113, Freon-114, Freon-115, Freon-134A, Freon-32, Freon-123, Freon-124, Freon-125, Freon-143A, Freon-141b, Freon-142b, Freon-225, Freon-C318, Freon-502, methyl chloride, ethyl chloride, air, oxygen, hydrogen, nitrogen, carbon dioxide, methane, propane, isobutane, n-butane, argon, helium, xenon and the like.

The multilayer tube of the present invention can be used as a feed hose, a return hose, an evaporator hose, a fuel filler hose, an ORVR hose, a reserve hose, a vent hose, an oil hose, a diesel gasoline hose, an oil drilling hose, an alcohol-containing gasoline hose, a brake hose, a hose for a window washer fluid, an engine coolant (LLC: Long Life Coolant) hose, a reservoir tank hose, a hose for transporting a urea solution, a cooler hose for cooling water, refrigerants and the like, a hose for air conditioner refrigerants, a heater hose, a road heating hose, a floor heating hose, a hose for infrastructure provision, a hose for extinguishers and fire extinguishing equipments, a hose for medical cooling machinery, a hose for spreading inks and paints, and a hose for the other chemical liquids or gases.

The multilayer tube of the present invention is useful in particular as an engine coolant (LLC: Long Life Coolant) hose, a diesel gasoline hose, an oil drilling hose, an alcohol-containing gasoline hose, a hose for transporting a urea solution, a heater hose, a reservoir tank hose, a road heating hose and a floor heating hose, which are intended for use in severe conditions.

<Method of Producing the Multilayer Tube>

A method of producing the multilayer tube of the present invention includes a method of melting and extruding resins and the like constituting respective layers, which are simultaneously multi-stratified inside or outside of a die by using extruders in a number corresponding a number of layers or a number of materials (a co-extrusion method), or a method of previously producing a monolayer tube or the multilayer tube by the method described above, and then, integrating and multi-stratifying resins sequentially outside by using an adhesive as necessary (a coating method). In the multilayer tube of the present invention, the tube is preferably produced by a co-extrusion method wherein thermoplastic resins are molded by co-extrusion in a molten state and respective layers are bonded with thermal fusion (molten adhesion) to produce the multilayer tube in a single step.

When a resultant multilayer tube has a complicated shape or the tube is subjected to a bending process with heat to give the molded article, in order to eliminate residual strain in the molded article, a molded article intended can be obtained by molding the multilayer tube described above and thereafter, a thermal treatment for 0.01 to 10 hours at a temperature less than the lowest melting point among resins constituting the tube.

Next, the fine carbon fiber, the fine short carbon fiber, the thermoplastic resin and the like to be used for the multilayer tube of the present invention are explained.

<<Fine Carbon Fiber and Fine Short Carbon Fiber>>

The following description summarizes typical features and typical production processes for a fine carbon fiber or fine short carbon fiber contained in a composition of the present invention.

1. A fine carbon fiber preferably produced by vapor growth, wherein
    a graphite-net plane consisting solely of carbon atoms forms a temple-bell-shaped structural unit comprising closed head-top part and body-part with open lower-end, where an angle θ formed by a generatrix of the body-part and a fiber axis is less than 15°,
    2 to 30 of the temple-bell-shaped structural units are stacked sharing a common central axis to form an aggregate, and
    the aggregates are connected in head-to-tail style with a distance to form the fiber.
2. The fine carbon fiber according to the above item 1, wherein an end of the body-part of the aggregate has an outer diameter D of 5 to 40 nm and an inner diameter d of 3 to 30 nm, and an aspect ratio (L/D) of the aggregate is 2 to 30.
3. The fine carbon fiber according to the above item 1 or 2, wherein an ash content is 4% by weight or less.
4. The fine carbon fiber according to any one of the above items 1 to 3, wherein a peak half width W (unit: degree) of 002 plane in the fine carbon fiber is 2 to 4 as determined by X-ray diffractometry.
5. The fine carbon fiber according to any one of the above items 1 to 4, wherein a graphite plane gap (d002) of the fine carbon fiber is 0.341 to 0.345 nm as determined by X-ray diffractometry.
6. A process for manufacturing a fine carbon fiber comprising feeding a mixed gas containing CO and $H_2$ onto a catalyst containing an element selected from the group consisting of Fe, Co, Ni, Al, Mg and Si, to initiate a reaction and growing the fine carbon fiber; wherein the catalyst preferably comprises a spinel-type oxide of cobalt, in which magnesium is contained by substitution forming solid solution.
7. The process for manufacturing a fine carbon fiber according to the above item 6, wherein when the spinel-type oxide is represented by $Mg_xCo_{3-x}O_y$, "x" which is a solid solution range of magnesium is 0.5 to 1.5.
8. The process for manufacturing a fine carbon fiber according to the above item 6 or 7, wherein in the spinel-type oxide, a crystal lattice constant "a" (cubic system) is 0.811 to 0.818 nm as determined by X-ray diffraction measurement.
9. The process for manufacturing a fine carbon fiber according to any one of the above items 6 to 8, wherein a volume ratio of CO/$H_2$ in the mixed gas is within the range of 70/30 to 99.9/0.1 and a reaction temperature is within the range of 400 to 650° C.
10. A fine short carbon fiber prepared by shortening a fine carbon fiber preferably produced by vapor growth, wherein a graphite-net plane forms a temple-bell-shaped structural unit comprising closed head-top part and body-part with open lower-end, 2 to 30 of the temple-bell-shaped structural units are stacked sharing a central axis to form an aggregate, and one to several tens of the aggregates are connected in head-to-tail style.
11. The fine short carbon fiber according to the above item 10, wherein the generatrix of the body-part and the fiber axis form an angle θ of less than 15°.
12. The fine short carbon fiber according to the above item 10 or 11, wherein an end of the body-part of the aggregate has an outer diameter D of 5 to 40 nm and an inner diameter d of 3 to 30 nm, and an aspect ratio (L/D) of the aggregate is 2 to 30.
13. The fine short carbon fiber according to any one of the above items 10 to 12, wherein an ash content is 4% by weight or less.
14. The fine short carbon fiber according to any one of the above items 10 to 13, wherein a peak half width W (unit: degree) of 002 plane in the fine carbon fiber is 2 to 4 as determined by X-ray diffractometry.
15. The fine short carbon fiber according to any one of the above items 10 to 14, wherein a graphite plane gap (d002) of the fine carbon fiber is 0.341 to 0.345 nm as determined by X-ray diffractometry.
16. A fine short carbon fiber produced by shortening the carbon fiber according to any one of the above items 1 to 5 by applying shear stress.
17. A process for manufacturing a fine short carbon fiber, comprising preparing a fine carbon fiber by the manufacturing process according to any one of the above items 6 to 9 and then applying shear stress to the fiber for shortening.

There will be described the above items in details

Figure 3:
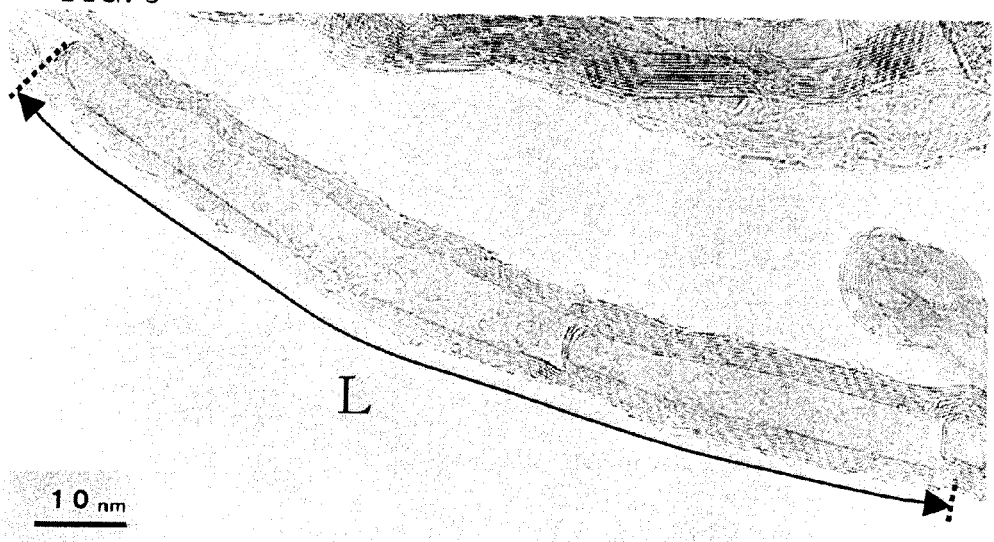
FIG. 3 is a TEM image of the fine carbon fiber produced in Production Example A.
Figure 5:
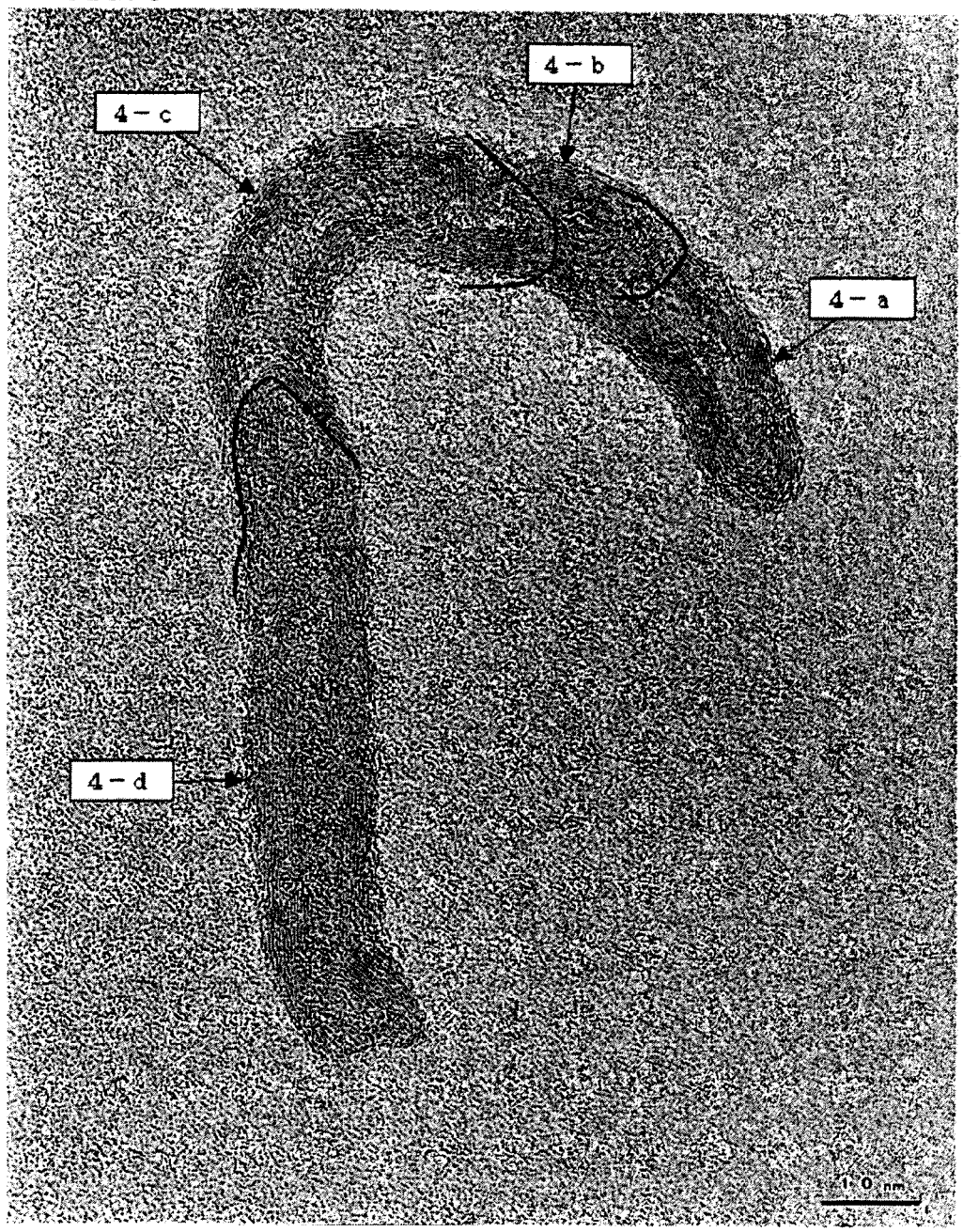
FIG. 5 is a TEM image of a fine carbon short fiber formed by shortening.

A fine carbon fiber and a fine short carbon fiber has a temple-bell-shaped structure as shown in FIG. 1(a) as a minimal structural unit. A temple bell is commonly found in Japanese temples, which has a relatively cylindrical-shaped body-part, which is different from a Christmas bell that is very close to cone-shape. As shown in FIG. 1(a), a structural unit 11 has a head-top part 12 and a body-part 13 having an open end like a temple bell and approximately has a shape as a body of rotation formed by rotation about a central axis. The structural unit 11 is constituted by a graphite-net plane consisting solely of carbon atoms, and the circumference of the open-end of the body-part is the open end of the graphite-net plane. Here, although the central axis and the body-part 13 are, for convenience, indicated by a straight line in FIG. 1(a), they are not necessarily straight, but may be curved as shown in FIGS. 3 and 5 described later.

The body-part 13 is gradually enlarged toward the open-end side, and as a result, the generatrix of the body-part 13 is slightly oblique to the central axis of the temple-bell-shaped structural unit and an angle formed θ by these is less than 15°, more preferably 1°<θ<15°, further preferably 2°<θ<10°. With an excessively large θ, a fine fiber constituting from the structural units has a structure like a fish bone carbon fiber, leading to deterioration in conductivity in a fiber axis direction. On the other hand, with a smaller θ, it has a structure like a cylindrical tube and thus the open end of the graphite-net plane constituting the body-part in the structural unit are less exposed in the outer circumference surface of the fiber, leading to deterioration in conductivity between adjacent fibers.

The fine carbon fiber and the fine short carbon fiber have defects and irregular disturbances, but when their shape is observed as a whole neglecting such irregularity, it can be the that they have a temple-bell-shaped structure where the body-part 13 is gradually enlarged toward the open end side. In terms of a fine short carbon fiber and a fine carbon fiber of the present invention, the above description does not mean that θ is within the above range in all parts, but means that when the structural unit 11 is observed as a whole neglecting defects and irregular parts, θ generally is within the above range. Therefore, in determination of θ, it is preferable to eliminate an area near the head-top part 12 where a thickness of the body-part irregularly varies. More specifically, for example, when a length of a temple-bell-shaped structural unit aggregate 21 (see, the description below) is "L" as shown in FIG. 1($b$), θ may be measured at three points ($1/4$)L, ($1/2$)L and ($3/4$)L from the head-top part side and an average of the measured values is determined and the average may be regarded as θ for the whole structural unit 11. "L" is ideally measured in a straight line, but actually, the body-part 13 is often curved, and therefore, it can be measured along the curve in the body-part 13 to give a substantially more real value.

When produced as a fine carbon fiber (the same goes for a fine short carbon fiber), the head-top part has a shape which is smoothly connected to the body-part and convexly curved to the upper side (in the figure). A length of the head-top part is typically about "D" (see FIG. 1($b$)) or less, sometimes about "d" (see FIG. 1($b$)) or less, wherein "D" and "d" will be described for a temple-bell-shaped structural unit aggregate.

Furthermore, as described later, active nitrogen is not used as a starting material, so that other atoms such as nitrogen are not contained in the graphite-net plane of the temple-bell-shaped structural unit. Thus, the fiber exhibits excellent crystallinity.

In a fine carbon fiber and a fine short carbon fiber used in the present invention, as shown in FIGS. 1($b$), 2 to 30 of such temple-bell-shaped structural units are stacked sharing a central axis, to form a temple-bell-shaped structural unit aggregate 21 (hereinafter, sometimes simply referred to as an "aggregate"). The stack number is preferably 2 to 25, more preferably 2 to 15.

An outer diameter "D" of the body-part of the aggregate 21 is 5 to 40 nm, preferably 5 to 30 nm, further preferably 5 to 20 nm. A diameter of a fine fiber increases as "D" increases, so that in a composite with a polymer, a large amount needs to be added for giving particular functions such as conductivity. On the other hand, as "D" decreases, a diameter of a fine fiber decreases, so that fibers tend to more strongly agglomerate each other, leading to, for example, difficulty in dispersing them in preparation of a composite with a polymer. A body-part outer diameter "D" is determined preferably by measuring it at three points ($1/4$)L, ($1/2$)L and ($3/4$)L from the head-top part of the aggregate and calculating an average. Although FIG. 1($b$) shows a body-part outer diameter "D" for convenience sake, an actual "D" is preferably an average of the measured values at the above three points.

An inner diameter "d" of the body-part of the aggregate is 3 to 30 nm, preferably 3 to 20 nm, further preferably 3 to 10 nm. Again, a body-part inner diameter "d" is determined preferably by measuring it at three points ($1/4$)L, ($1/2$)L and ($3/4$)L from the head-top part of the temple-bell-shaped structural unit aggregate and calculating an average. Although FIG. 1($b$) shows a body-part inner diameter "d" for convenience sake, an actual "d" is preferably an average of the measured values at the above three points.

An aspect ratio (L/D) calculated from a length "L" of the aggregate 21 and a body-part outer diameter "D" is 2 to 150, preferably 2 to 30, more preferably 2 to 20, further preferably 2 to 10. With a larger aspect ratio, a fiber formed has a structure of a more cylindrical tube and conductivity in a fiber axis direction in a single fiber is improved, but the open ends of the graphite-net planes constituting the body-part of the structural units are less frequently exposed in the circumferential surface of the fiber, leading to deterioration in conductivity between adjacent fibers. On the other hand, with a smaller aspect ratio, the open ends of the graphite-net planes constituting the body-part of the structural units are more frequently exposed in the circumferential surface of the fiber, so that conductivity between adjacent fibers can be improved, but a fiber circumferential surface is constituted by a number of connected short graphite-net planes in a fiber axis direction, leading to deterioration in conductivity in a fiber axis direction in a single fiber.

The fine carbon fiber and the fine short carbon fiber share an essentially common configuration for a temple-bell-shaped structural unit and a temple-bell-shaped structural unit aggregate, but a fiber length is different as described below.

Figure 2:
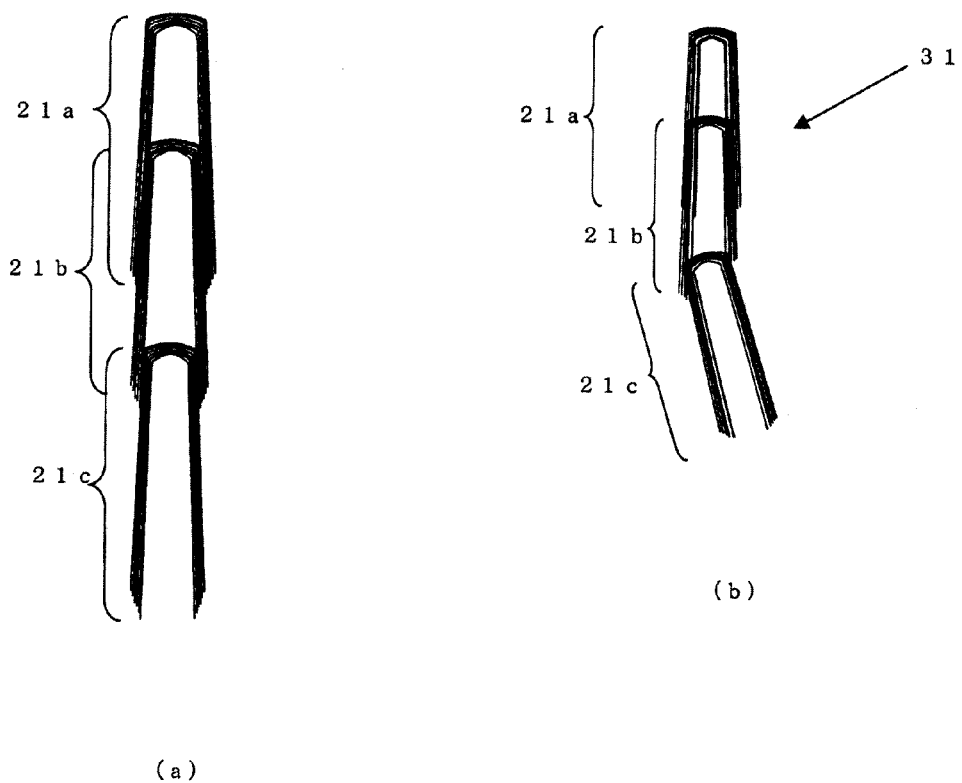
FIG. 2(a) is a drawing schematically showing connecting aggregates with a certain distance to form a fiber.
FIG. 2(b) is a drawing schematically showing curved connection when aggregates are connected with a certain distance.

First, the fine carbon fiber is formed by connecting the aggregates in a head-to-tail style as shown in FIG. 2($a$). A head-to-tail style means that in a configuration of the fine carbon fiber, a bonding site between adjacent aggregates is formed from a combination of the head-top part (head) of one aggregate and the lower end (tail) of the other aggregate. As a specific style of bonding the part, the head-top part of the outermost temple-bell-shaped structural unit in the second aggregate 21$b$ is inserted into the inner part of the innermost temple-bell-shaped structural unit at a lower opening of a first aggregate 21$a$; and furthermore, the head-top part of a third aggregate 21$c$ is inserted into the lower opening of a second aggregate 21$b$, and a number of such combinations are serially connected to form a fiber.

Each bonding part forming one fine fiber of the fine carbon fibers does not have structural regularity; for example, a length of a bonding part between a first aggregate and a second aggregate in a fiber axis direction is not necessarily equal to a length of a bonding part between the second aggregate and a third aggregate. Furthermore, as shown in FIG. 2($a$), two aggregates bonded share a common central axis and may be connected in a straight line, but as in the temple-bell-shaped structural unit aggregates 21$b$ and 21$c$ shown in FIG. 2($b$), they may be bonded without sharing a central axis, resulting in a curved structure in the bonding part. A length "L" of the temple-bell-shaped structural unit aggregate is approximately constant in each fiber. However, since in vapor phase growth, starting materials and byproduct gaseous components and a catalyst and a solid product component exist in mixture, a temperature distribution may occur in a reaction vessel; for example, a local site at a temporarily higher temperature generates depending on a flowing state of the above heterogeneous reaction mixture of a gas and a solid during an exothermic carbon precipitating reaction, possibly resulting in variation in a length "L" to some extent.

In the fine carbon fiber thus constituted, at least some of the open ends of the graphite-net planes in the lower end of the temple-bell-shaped structural units are exposed in the fiber circumferential surface, depending on a connection distance of the aggregates. Consequently, without conductivity in a fiber axis direction in a single fiber being deteriorated, conductivity between adjacent fibers can be improved due to jumping effect by n-electron emission (tunnel effect) as described above. Such a fine carbon fiber structure can be observed by a TEM image. Furthermore, it can be believed that the effects of a fine carbon fiber are little affected by curving of the aggregate itself or curving of the connection part of the aggregates. Therefore, parameters associated with a structure can be determined by observing an aggregate having a relatively straight part in a TEM image, as the structural parameters (θ, D, d, L) for the fiber.

Next, a fine short carbon fiber is prepared by further shortening the fine carbon fiber thus formed. Specifically, shear stress is applied to the fine carbon fiber, to cause sliding between graphite fundamental planes in the aggregate bonding part, so that the fine carbon fiber is shortened at some of the bonding parts of the aggregates to give a shorter fiber. The fine short carbon fiber formed by such fiber shortening is as short as a fiber length of 1 to about several ten aggregates (that is, 100 or less, up to about 80, preferably up to about 70), preferably one to 20 aggregates which are connected. An aspect ratio of the aggregates in this fine short carbon fiber is about 2 to 150. An aspect ratio of the aggregates in the fine short carbon fiber which is suitable for mixing is 2 to 50. Even when shear stress is applied, cleavage does not occur in a fiber straight body-part of the fiber consisting of carbon SP2 bonds in the aggregate, so that the fiber cannot be cut into a unit smaller than an aggregate.

Also in the fine short carbon fiber, since the end surface of the graphite net is exposed, conductivity between adjacent fibers is as high as a fine carbon fiber before fiber shortening due to jumping effect by n-electron emission (tunnel effect) as described above while conductivity in a fiber axis in a single fiber is not deteriorated. A structure of a fine short carbon fiber after fiber shortening as described above can be observed by a TEM image. Furthermore, it can be believed that the effects of the fine short carbon fiber are little affected by curving of the aggregate itself or curving of the bonding part of the aggregates. In the fine short carbon fiber in FIG. 5, four temple-bell-shaped structural unit aggregates of 4-*a* to 4-*d* are connected as shown in the figure, and for each, θ and an aspect ratio (L/D) are 4-*a*: θ=4.8°, (L/D)=2.5; 4-*b*: θ=0.5°, (L/D)=2.0; 4-*c*; θ=4.5°, (L/D)=5.0; 4-*d*: θ=1.1°, (L/D)=5.5.

In XRD by Gakushin-method of a fine carbon fiber and a short carbon fiber, a peak half width W (unit: degree) of 002 plane measured is within the range of 2 to 4. If W is more than 4, graphite exhibits poor crystallinity and poor conductivity. On the other hand, if W is less than 2, graphite exhibits good crystallinity, but at the same time, fiber diameter becomes large, so that a larger amount is required for giving functions such as conductivity to a polymer.

A graphite plane gap d002 as determined by XRD using Gakushin-method of a fine carbon fiber and a short carbon fiber is 0.350 nm or less, preferably 0.341 to 0.348 nm. If d002 is more than 0.350 nm, graphite crystallinity is deteriorated and conductivity is reduced. On the other hand, a fiber of 0.341 nm is produced in a low yield in the production.

The ash content contained in the fine carbon fiber and the short carbon fiber is 4% by weight or less, and therefore, purification is not necessary for a common application. Generally, it is 0.3% by weight or more and 4% by weight or less, more preferably 0.3% by weight or more and 3% by weight or less. The ash content is determined from a weight of an oxide as a residue after combustion of 0.1 g or more of a fiber.

A short carbon fiber has a fiber length of preferably 100 to 1000 nm, more preferably 100 to 300 nm. A fine short carbon fiber having such a length in which a peak half width W (unit: degree) of the above 002 plane is 2 to 4 and a graphite plane gap d002 is 0.350 nm or less, preferably 0.341 to 0.348 nm is a novel fiber which is not known in the prior art.

As described above, fine carbon fibers contained in a composition of the present invention are electroconductive carbon fibers which do not belong to any of three categories of the so-called carbon nanotubes (1) to (3). It is possible that a temple-bell-shaped body slightly inclined outward is responsible for electron flow in a longitudinal direction of the fiber itself while electron emission from the open end of the temple-bell-shaped body is responsible for inter-fiber electron flow, and this probably contributes to improvement in conductivity performance in the resin.

It is also supposed that the presence of the open end which is an active site leads to high affinity for a resin and improved dispersibility in kneading and at the same time contributes to maintenance and improvement of the physical properties of the resin.

Since a bonding-part of aggregates of temple-bell-shaped structural units are connected via a weak van der Waals' force, the aggregates are separated off at the bonding site by shear force during kneading. In general, in catalytic vapor phase growth which is believed at present to be the most promising approach for large-scale production, agglomerates in which long filamentous fibers having a length of 1 μm or more are intricately-entangled (several μm to 1 mm fuzzballs) are formed. However, fine carbon fibers used in the present invention are cut in a proper length by adjusting shear force, promoting shortening and opening of fiber assemblies, so that a conductive resin composition can be provided without using special dispersing technique or device.

Furthermore, fine short carbon fibers are formed by cutting fibers in bonding sites, resulting in further improvement in dispersibility.

There will be described a process for manufacturing a fine carbon fiber and a fine short carbon fiber. A fine short carbon fiber is produced by shortening a fine carbon fiber.

<Process for Manufacturing a Fine Carbon Fiber>

First, a process for manufacturing a fine carbon fiber is as follows. The fine carbon fiber is produced by vapor phase growth using a catalyst. Preferred catalyst comprises an element selected from the group consisting of Fe, Co, Ni, Al, Mg and Si, and the preferred feed gas is a mixed gas containing CO and $H_2$. Most preferably, using a catalyst which is an oxide of cobalt having a spinel type crystal structure containing magnesium by substitution forming solid solution, vapor phase growth is conducted supplying a mixed gas containing CO and $H_2$ to the catalyst particles to produce a fine carbon fiber.

A spinel type crystal structure of cobalt where Mg is substituted forming solid solution is represented by $Mg_xCo_{3-x}O_y$. In this formula, x is a number indicating substitution of Co by Mg, and nominally, $0<x<3$. Furthermore, y is a number selected such that electric charge of the whole formula becomes neutral, and is formally a number of 4 or less. That is, a spinel-type oxide of cobalt $Co_3O_4$ contains divalent and trivalent Co ions, and when divalent and trivalent cobalt ions are represented by $Co^{II}$ and $Co^{III}$, respectively, a cobalt oxide having a spinel type crystal structure is represented by $Co^{II}Co^{III}_2O_4$. Both sites of $Co^{II}$ and $Co^{III}$ are substituted by Mg to form a solid solution. After the solid solution formation by substitution with Mg for $Co^{III}$, electric charge is kept to be neutral and thus y is less than 4. However, both x and y have a value within a range that a spinel type crystal structure can be maintained.

For the use as a catalyst, a solid solution range of Mg represented by x is preferably 0.5 to 1.5, more preferably 0.7 to 1.5. A solid solution amount as x of less than 0.5 results in poor catalyst activity, leading to production of a fine carbon fiber in a lower yield. If x is more than 1.5, it is difficult to produce a spinel type crystal structure.

A spinel-type oxide crystal structure of the catalyst can be confirmed by XRD, and a crystal lattice constant "a" (cubic system) is within the range of 0.811 to 0.818 nm, more preferably 0.812 to 0.818 nm. If "a" is small, substitutional solid solution formation with Mg is inadequate and catalyst activity is low. The above spinel-type oxide crystal having a lattice constant larger than 0.818 nm is difficult to produce.

We suppose that such a catalyst is suitable because solid solution formation by substitution with magnesium in the spinel structure oxide of cobalt provides a crystal structure as if cobalt is dispersedly placed in magnesium matrix, so that under the reaction conditions, aggregation of cobalt is inhibited.

A particle size of the catalyst can be selected as appropriate and for example, is 0.1 to 100 μm, preferably 0.1 to 10 μm as a median diameter.

Catalyst particles are generally placed on an appropriate support such as a substrate or a catalyst bed by an appropriate application method such as spraying, for use. Spraying catalyst particles on a substrate or catalyst bed can be conducted by directly spraying the catalyst particles or spraying a suspension of the particles in a solvent such as ethanol and then drying it to spray a desired amount.

It is also preferable that catalyst particles are activated before being reacted with a source gas. Activation is generally conducted by heating under a gas atmosphere containing $H_2$ or CO. Such activation can be conducted by diluting the above gas with an inert gas such as He and $N_2$ as necessary. A temperature at which activation is conducted is preferably 400 to 600° C., more preferably 450 to 550° C.

There are no particular restrictions to a reactor for vapor phase growth, which can be conducted using a reactor such as a fixed-bed reactor and a fluidized-bed reactor.

A mixed gas containing CO and $H_2$ is used as a source gas to be a carbon source in vapor-phase growth.

An addition concentration of $H_2$ gas $\{(H_2/(H_2+CO)\}$ is preferably 0.1 to 30 vol %, more preferably 2 to 20 vol %. When the addition concentration is too low, cylindrical graphite net planes form a carbon-nanotube-like structure parallel to a fiber axis. On the other hand, if it is more than 30 vol %, the angle of the temple-bell-shaped structure oblique to the fiber axis of a carbon side peripheral surface becomes larger and similar to a fish-bone shape, leading to lower conductivity in a fiber direction.

The source gas can contain an inert gas. Examples of such an inert gas include $CO_2$, $N_2$, He and Ar. The inert gas is preferably contained in such an amount that it does not significantly reduce a reaction rate; for example, 80 vol % or less, preferably 50 vol % or less. Furthermore, a synthetic gas containing $H_2$ and CO or a waste gas such as a steel converter exhaust gas can be, as necessary, used after appropriate treatment.

A reaction temperature for conducting vapor-phase growth is preferably 400 to 650° C., more preferably 500 to 600° C. If a reaction temperature is too low, a fiber does not grow. On the other hand, if a reaction temperature is too high, an yield is reduced. A reaction time is, but not limited to, for example, 2 hours or more and about 12 hours or less.

In terms of a reaction pressure, vapor-phase growth can be conducted at an ambient pressure from the viewpoint of convenience of a reactor or operation, but as long as carbon growth of Boudouard equilibrium proceeds, the reaction can be conducted under the pressurized or reduced-pressure condition.

It has been demonstrated that according to this manufacturing process for a fine carbon fiber, an yield of a fine carbon fiber per a unit weight of the catalyst is considerably higher than that in a conventional manufacturing process. An yield of a fine carbon fiber according to this manufacturing process for a fine carbon fiber is 40 folds or more, for example 40 to 200 folds per a unit weight of the catalyst. As a result, a fine carbon fiber containing reduced amount of impurities and ash content as described above can be produced.

Although a process of forming the bonding part unique to the fine carbon fiber prepared by this manufacturing process for a fine carbon fiber is not clearly understood, it is speculated that balance between exothermic Boudouard equilibrium and heat removal by source-gas flowing causes variation of a temperature near the fine cobalt particles formed from the catalyst, so that carbon growth intermittently proceeds, resulting in formation of the bonding part. In other words, it is speculated that four processes: [1] formation of a head-top part of a temple-bell-shaped structure, [2] growth of a body-part in the temple-bell-shaped structure, [3] pause of growth due to temperature increase caused by the processes [1] and [2], and [4] cooling by a flowing gas, are repeated on fine catalyst particles, to form the bonding part unique to a fine carbon fiber structure.

<Manufacturing Process for a Fine Short Carbon Fiber>

As described above, a fine carbon fiber can be produced. Next, a fine short carbon fiber can be produced by separating a fine carbon fiber to shorten it. Preferably, it is prepared by applying shear stress to the fine carbon fiber. Suitable examples of a specific fiber shortening method include those using a grinder, a tumbling ball mill, a centrifugal ball mill, a centrifugal planetary ball mill, a bead mill, a microbead mill, an attriter type high-speed ball mill, a rotating rod mill, a vibrating rod mill, a roll mill and a three-roll mill. The fiber shortening of the fine carbon fiber may be conducted in wet-process or dry-process. Wet fiber shortening may be conducted in the presence of either a resin or a resin and a filler. Since fine carbon fibers before fiber shortening aggregate like a fluff ball, the presence of a small medium capable of loosening such a ball can accelerate shredding and fiber shortening. Furthermore, coexistence of a fine filler allows for shortening of the fine carbon fiber and mixing and dispersing the filler can be conducted at the same time. An atmosphere in dry fiber shortening can be selected from an inert atmosphere or an oxidative atmosphere, depending on a purpose.

Figure 4:
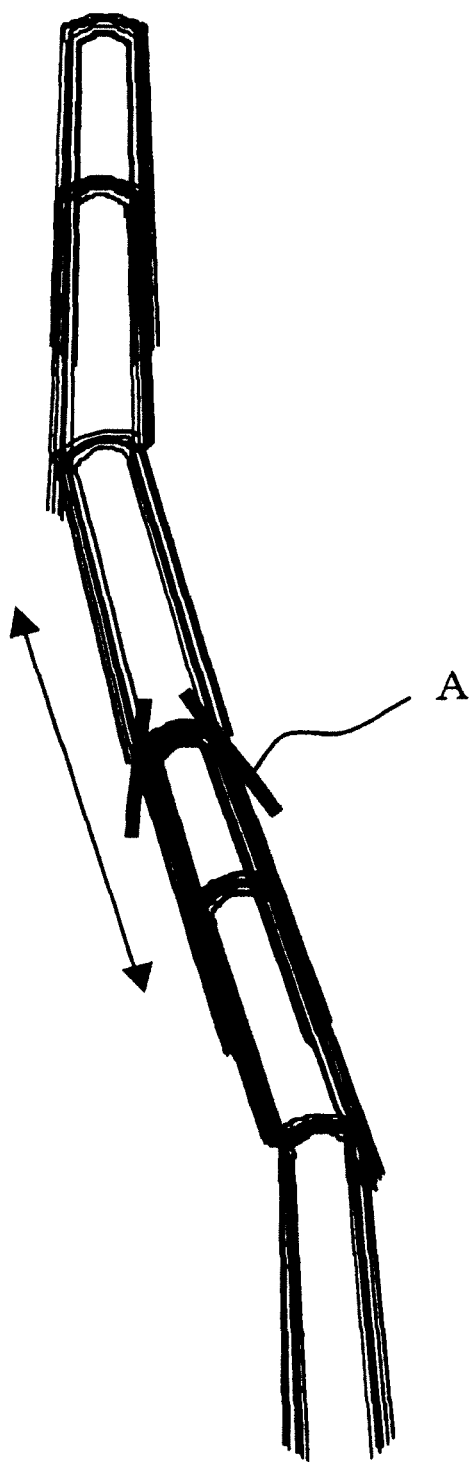
FIG. 4 is a schematic drawing showing that a fine carbon fiber is pulled out to form a fine short carbon fiber by shear stress.

The reason why the fine carbon fiber can be easily shortened by applying shear stress is due to the structure of the fine carbon fiber. Specifically, it is because a fine carbon fiber is formed from temple-bell-shaped structural unit aggregates connected in a head-to-tail style with a distance. When shear stress is applied to the fiber, the fiber is pulled to the fiber axis direction indicated by an arrow in FIG. 4, and then sliding occurs between carbon fundamental planes constituting a bonding part (in FIG. 4, see region A: "two sticks" shape which is Japanese katakana "ha"), and one to several ten temple-bell-shaped structural unit aggregates are pulled off at the head-to-tail bonding parts, resulting in fiber shortening. That is, the head-to-tail bonding part is not formed by consecutive carbon double bonds in a fiber axis direction like a concentric fine carbon fiber, but formed by bonds mainly via van der Waals force with a lower bond energy. When crystallinity is compared between a fine carbon fiber and a fine short carbon fiber prepared by shortening the above fine carbon fiber on the basis of a carbon layer gap and a true specific gravity, difference is not observed in carbon crystallinity between these. However, in comparison with the fine carbon fiber, the fine short carbon fiber after fiber shortening has a larger surface area by about 2 to 5%. Increase of a surface area to this extent would be due to fiber shortening, indicating that shortening of a fine carbon fiber is caused by the pulling-off of the temple-bell-shaped structural unit aggregates simply from their bonding sites, while carbon crystallinity of the temple-bell-shaped structural unit aggregates in the fine carbon fiber is not deteriorated.

<<Resin Component>>

Although the thermoplastic resin in the present invention, which is contained in the outer layer of the multilayer tube or the electroconductive inner layer wherein the fine carbon fiber or the fine short carbon fiber is dispersed, is not particularly limited, the thermoplastic resin includes, for example, a polyolefin-based resin (polyethylene, polypropylene, ethylene vinyl acetate copolymer resin, ethylene vinyl copolymer resin, ethylene ethyl acrylate copolymer resin, ionomer and the like), a polyvinyl-based resin (polyvinyl chloride, styrene, ABS resin and the like), a polyester-based resin (polyethylene terephthalate, polybutylene terephthalate, polyethylene naphthalate, polycarbonate, liquid crystal polymer and the like), a polyether-based resin (polyoxymethylene, polyphenylene ether, aromaticpolysulfone, polyether ketones, polyphenylene sulfide, polyether imide and the like), a fluoric resin (polytetrafluoroethylene, polyvinylidene fluoride and the like), a polyamide and the like, and a polyamide is preferable. As a polyamide, an aliphatic polyamide such as nylon 6, nylon 66, nylon 11 and nylon 12 and a copolymer thereof, an aromatic polyamide such as nylon 66/6T, nylon 6T/6I and nylon MXD6 and a copolymer thereof and a polyamide obtained from a dicarboxylic acid component comprising oxalic acid and/or terephthalic acid and a diamine component having 4 to 12 carbon atoms are more preferable. These may be used singly or by mixing two or more.

For the thermoplastic resin to be used particularly in the electroconductive inner layer wherein the fine carbon fiber or the fine short carbon fiber is dispersed, an aliphatic polyamide and a copolymer thereof and an aromatic polyamide and a copolymer thereof are preferable due to a direct contact with a fuel and a chemical liquid at a high temperature.

A thermoplastic resin not exemplified above, an elastomer, a biodegradable plastic and the like may be also mixed within a range which does not impair the objectives of the present invention, and these may be used solely or by mixing two or more.

An aspect in the present invention includes a case wherein a polyamide resin is used as the thermoplastic resin, which is obtained by using oxalic acid as a dicarboxylic acid component and by using a diamine having 4 to 12 carbon atoms as a diamine component. The polyamide resin is particularly suitable for suppressing the permeant diffusivity of a fuel and a chemical liquid.

As the above-described diamine having 4 to 12 carbon atoms, an aliphatic diamine, an alicyclic diamine and an aromatic diamine having 4 to 12 carbon atoms are respectively preferable, and nonanediamine, decanediamine and dodecanediamine and an isomer thereof are more preferable. These may be used solely or by mixing two or more. When two or more diamines are mixed to be used, a diamine mixture is exemplified, for example, of 1,9-nonanediamine and 2-methyl-1,8-octanediamine. In the mixture, a molar ratio of 1,9-nonanediamine and 2-methyl-1,8-octanediamine is 1:99 to 99:1, more preferably 5:95 to 40:60 or 60:40 to 95:5, and particularly preferably 5:95 to 30:70 or 70:30 to 90:10.

When oxalic acid is used as a dicarboxylic acid component, an oxalate diester is preferably used as a source of oxalic acid. There is no particular restriction on the oxalate diester so long as it has a reactivity with an amino group, which includes an oxalate diester of an aliphatic monohydric alcohol such as dimethyl oxalate, diethyl oxalate, di-n-(or i-)propyl oxalate and di-n-(or i- or t-)butyl oxalate, an oxalate diester of an alicyclic alcohol such as dicyclohexyl oxalate, an oxalate diester of an aromatic alcohol such as diphenyl oxalate, and the like.

Among the oxalate diesters described above, the oxalate diester of an aliphatic monohydric alcohol having carbon atoms more than 3, the oxalate diester of an alicyclic alcohol and the oxalate diester of an aromatic alcohol are preferable, and among them, dibutyl oxalate and diphenyl oxalate are particularly preferable.

Another aspect in the present invention includes a case wherein a polyamide resin is used as the thermoplastic resin, which is obtained by using a mixture comprising an aromatic dicarboxylic acid, preferably terephthalic acid as a dicarboxylic acid component, and a diamine substantively consisting of 1,9-nonanediamine and 2-methyl-1,8-octanediamine as a diamine component (for example, 95 wt % or more and preferably about 100 wt % of the diamine component) in which a molar ratio of 1,9-nonanediamine and 2-methyl-1,8-octanediamine is 1:99 to 99:1. It is preferred that the polyamide resin contains 60 to 100% by mole of a terephthalic acid unit relative to an entire unit of dicarboxylic acids. As the dicarboxylic acid component, terephthalic acid may be mixed with another dicarboxylic acid to use, and at this time it is preferred that the dicarboxylic acid other than terephthalic acid is not more than 40% by mole of an entire component of dicarboxylic acids. Furthermore, as dicarboxylic acids other than terephthalic acid described above, aromatic dicarboxylic acids other than terephthalic acid are preferably used, and at this time, a content ratio of terephthalic acid relative to an entire component of dicarboxylic acids is preferably within a range of 75 to 100% by mole and more preferably within a range of 90 to 100% by mole.

<Method for Producing the Polyamide Resin>

The polyamide resin to be used for the present invention can be produced by using any method known as a method for producing a polyamide. In accordance with studies by the inventors of the present invention, the polyamide resin can be obtained by a polycondensation of reacting a diamine and a dicarboxylic acid such as oxalic acid or terephthalic acid in a batch system or a continuous system.

<Additional Component>

An additional component may also be used together in the thermoplastic resin to be used for the multilayer tube of the present invention in order to more effectively exhibit intended functions. Such additional component includes various pigments, a heat resistance agent such as a copper compound, various additives such as an ultraviolet absorber, a light stabilizer, an antioxidant, a flame retardant, a crystallization accelerator, a plasticizer and a lubricant, a filler and the like.

A pigment includes an extender pigment (a transparency white pigment such as barium sulfate, calcium carbonate, silica and aluminum oxide), a black pigment (carbon black, magnetite and the like), a white pigment (titanium dioxide, zinc oxide, tin dioxide, zirconium oxide and the like), a black and colored pigment (cobalt blue, titan yellow and the like).

A filler includes an electroconductive filler {metal-based (silver, copper, nickel, stainless fiber and the like), oxide-based filler (ZnO, ITO, ATO, nitride, carbide, boride), carbon, organic-based}, a magnetism filler (ferrite, Sm/Co, Nd/Fe/B and the like), a piezoelectric filler, a thermal conductive filler (Ag, h-BN, AlN, $Al_2O_3$), a reinforcement filler (a glass fiber, a carbon fiber, MOS, talc, mica and the like), a molding processable filler, an impact resistance filler, an abrasion resistance filler, a heat resistance filler (clay mineral, talc, calcium carbonate, sedimentation barium sulfate and the like), a flame retardant filler (zinc borate, red phosphorus, ammonium phosphate, magnesium hydroxide and the like), a sound insulation/vibration proofed filler (iron powder, barium sulfate, mica, ferrite and the like), a solid lubricant filler (graphite, molybdenum disulfide, fluoric resin powder, talc and the like), a heat radiation filler (hydrotalcite, aluminum oxide, charcoal, magnesium oxide and the like) and the like.

<Method for Producing the Electroconductive Thermoplastic Resin Composition>

The electroconductive thermoplastic resin composition to be used for the inner layer of the multilayer tube of the present invention is prepared by mixing the thermoplastic resin component, the fine carbon fiber (including the fine short carbon fiber), an additional component as necessary and the like by a known method of mixing. Since in particular, the fine carbon fiber (including the fine short carbon fiber) is excellent in a dispersibility, the composition can be produced by a known method of kneading and with kneading machines.

For example, after adding resin the fine carbon fiber and an additional component as necessary to the thermoplastic, the production can be carried out by dispersing them into the thermoplastic resin in a state of melting or softening by using a roll mill, a melt blender (the Banbury mixer, the Brabender, the Ko-kneader), a single or double screw extruding kneader.

The provision method of the fine carbon fiber and the additional component may be done collectively or in multiple steps.

EXAMPLES

Hereinafter, examples together with comparative examples are explained; however, the present invention is not limited thereby in any way. Measurements in the examples were performed by the following methods.

(1) Relative Viscosity ($\eta r$):

$\eta r$ was measured at 25° C. by using the Ostwald's viscometer using a 96% sulfuric acid solution of polyamide (concentration: 1.0 g/dl).

(2) Mechanical Physical Properties

[1] Tensile Elongation

Evaluation was made by the method described in SAE J-2260 A.4.1.

[2] Impact Resistance at Low Temperature

Evaluation was made by the method described in DIN 73378 6.4.6.

[3] Fracture Pressure Strength

Evaluation was made by the method described in SAE J-2260 7.1.

(3) Fuel Resistance

One end of a hose cut to 200 mm was sealed, into which an alcohol gasoline was fed wherein Fuel C (isooctane/toluene=50/50 in a volume ratio) and ethanol at a volume ratio of 90/10 were mixed, and then, the other end was also sealed. The test hose was then placed in an oven at 60° C. and treated for 1000 hours. Measurements on the hose after the treatment were made for a tensile elongation, an impact resistance at low temperature and a fracture pressure strength in accordance with the methods described above. For the tensile elongation, a holding rate was calculated by the formula described below.

(Holding ratio)=(Tensile elongation of the hose after the treatment)/(Tensile elongation of the hose before the treatment)×100(%)

(4) Surface Specific Resistivity

Evaluation was made by the method described in SAE J-2260 7.9.3.2.

Production Example A

Synthesis of Fine Carbon Fibers

<Production Examples A1>

In 500 mL of ion-exchanged water were dissolved 115 g of cobalt nitrate [$Co(NO_3)_2.6H_2O$: molecular weight 291.03] (0.40 mol) and 102 g of magnesium nitrate [$Mg(NO_3)_2.6H_2O$: molecular weight 256.41] (0.40 mol), to prepare raw-material solution (1). Furthermore, 220 g of powdery ammonium bicarbonate [$(NH_4)HCO_3$: molecular weight 79.06] (2.78 mol) was dissolved in 1100 mL of ion-exchanged water, to prepare raw-material solution (2). Next, raw-material solutions (1) and (2) were mixed at a reaction temperature of 40° C., after which the mixture was stirred for 4 hours. The precipitate formed was filtered, washed and then dried.

The product was calcined and pulverized with a mortar to provide 43 g of a catalyst. A crystal lattice constant "a" (cubic system) of the spinel structure in this catalyst was 0.8162 nm, and a metallic element ratio in the spinel structure of the substitutional solid solution was Mg:Co=1.4:1.6.

A quartz reaction tube (inner diameter: 75 mm$\phi$, height: 650 mm) was perpendicularly fixed and in its center was placed a support of silica wool on which was then dispersed 0.9 g of the catalyst. Under He atmosphere, the tube was heated to a furnace temperature of 550° C., and then a mixed gas consisting of CO and $H_2$ (volume ratio: CO/$H_2$=95.1/4.9) as a source gas was fed from the bottom of the reaction tube at a flow rate of 1.28 L/min for 7 hours, to synthesize a fine carbon fiber.

An yield was 53.1 g, and an ash content was determined as 1.5% by weight. A peak half width "W" (degree) observed in XRD analysis of the product was 3.156 and d002 was 0.3437 nm. Furthermore, from a TEM image, parameters related to the dimensions of temple-bell-shaped structural units constituting the fine carbon fiber obtained and the aggregate of these were D=12 nm, d=7 nm, L=114 nm, L/D=9.5, $\theta$=0 to 7° (average: about 3°. A stack number of the temple-bell-shaped structural units constituting the aggregate was 4 to 5. Here, D, d and $\theta$ were determined for three points (¼)L, (½)L and (¾)L from the head-top of the aggregate.

FIG. 3 shows a TEM image of the fine carbon fiber prepared.

A fine carbon fibers thus obtained was treated by a ceramic ball mill with a diameter of 2 mm for a predetermined time to prepare a fine short carbon fiber. FIG. 5 shows TEM images of a fine short carbon fiber after 20 hours. From the TEM images in FIG. 5, parameters related to the dimensions of temple-bell-shaped structural units constituting the fine short carbon fiber thus obtained and the aggregate of these were D=10.6 to 13.2 nm, L/D=2.0 to 5.5, $\theta$=0.5° to 10°. Here, $\theta$ is an inclination average of the right and the left carbon layers to the center of the fiber axis in the TEM image. A stack number of the temple-bell-shaped structural units forming the aggregate was 10 to 20.

Production Example B

Production of the Polyamide Resin by Using Oxalic Acid as the Dicarboxylic Acid Component <Production Example B>

28.40 kg (140.4 mol) of dibutyl oxalate was charged into a pressure tight vessel which was equipped with a stirrer, a thermometer, a torquemeter, a pressure gauge, a feedstock inlet to which a diaphragm pump was directly connected, a nitrogen gas inlet, a pressure vomitory, a pressure regulator and a polymer outlet, and which had an inner volume of 150 liters. After repeating 5 times an operation of pressuring the vessel inside by 0.5 MPa with a nitrogen gas having a purity of 99.9999% and releasing the nitrogen gas down to an ordinary pressure to perform a replacement with nitrogen, a temperature in the system was raised while stirring under a confined pressure. After a temperature of dibutyl oxalate was achieved up to 100° C. over 30 minutes, a mixture of 18.89 kg (119.3 moles) of 1,9-nonanediamine and 3.34 kg (21.1 moles) of 2-methyl-1,8-octanediamine (a molar ratio of 1,9-nonanediamine and 2-methyl-1,8-octanediamine being 85:15) was supplied into the reaction vessel over about 17 minutes at a flow rate of 1.49 liters/minute by the diaphragm pump, and at the same time the temperature was raised. In the immediate aftermath of the provision, the inside pressure in the pressure tight vessel rose up to 0.35 MPa due to butanol resultant from the polycondensation reaction, and the temperature of the polycondensation product rose up to 170° C. Thereafter, the temperature was raised up to 235° C. over 1 hour. In the meantime, the inside pressure was regulated at 0.5 MPa while the resultant butanol was drained from the pressure vomitory. Immediately after the temperature of the polycondensation product reached 235° C., butanol was drained from the pressure vomitory over about 20 minutes to let the inside pressure to be an ordinary pressure. Once the ordinary pressure was achieved, temperature rise was initiated while flowing a nitrogen gas at 1.5 liters/minute and the temperature of the polycondensation product was achieved to be 260° C. over about 1 hour to perform the reaction at 260° C. for 4.5 hours. Thereafter, stirring was terminated and after the system inside was pressured by 1 MPa with nitrogen and left to stand for about 10 minutes, outgassing was made down to the inside pressure of 0.5 MPa and the polycondensation product was drained in form of a string from a draining outlet underneath the pressure tight vessel. The polycondensation product in form of a string was immediately cooled down with water, and the water-cooled resin in form of a string was pelletized by a pelletizer. The resultant polyamide was a transparent tough polymer, and its melting point was 235° C. and its relative viscosity was 3.20.

Production Example C

Production of the Polyamide Resin Consisting of 1,9-nonanediamine and 2-methyl-1,8-octanediamine as the Diamine Component <Production Example C>

15829 g (100 moles) of 1,9-nonanediamine, 15829 g (100 moles) of 2-methyl-1,8-octanediamine, 32927 g (198.2 moles) of terephthalic acid, 439.6 g (3.6 moles) of benzoic acid as a terminator, 60 g (0.1% by mass relative to the feedstock) of sodium hypophosphite monohydrate and 40 liters of distilled water were fed into an autoclave, and replacement with nitrogen was made. Stirring was made at 100° C. for 30 minutes, and the inside temperature was raised up to 210° C. over 2 hours. At this moment, the pressure of the autoclave rose up to 2.2 MPa. After continuing the reaction in this state for 1 hour, the temperature was raised up to 230° C., and thereafter the temperature was kept at 230° C. for 2 hours to allow the reaction to proceed while keeping the pressure at 2.2 MPa by gradually extracting water vapor. Then, the pressure was reduced down to 1.0 MPa over 30 minutes, and the reaction was further allowed to proceed for 1 hour to obtain a prepolymer. This was dried at 100° C. for 12 hours under reduced pressure and ground to a size not more than 2 mm. This was subjected to solid phase polymerization at 230° C. under 0.013 KPa for 10 hours to obtain the polyamide resin Cl with a melting point of 265° C. and a relative viscosity of 2.80.

<Materials>

Other materials used in the Examples and Comparative examples are described as follows.

The resins (D) to (F) described below were used.

(D) Polyamide 6: The polyamide 6 resin (1022B made by the Ube Industries, Ltd.) with a relative viscosity of 3.35.

(E) Polyamide 12: UBESTA3030U (made by the Ube Industries, Ltd., relative viscosity: 2.27) was previously mixed with JSR T7712SP (made by the JSR Corporation) as an impact resistance improver, which was supplied to a double screw melting kneader, while N-butylbenzene-sulfonic acid amide (BBSA) as a plasticizer was injected by a quantitative pump into the middle of the cylinder of the double screw melting kneader. They are melted and kneaded at 240° C. and the molten kneaded product was pelletized to obtain the nylon 12 resin composition consisting of 85% by weight of a nylon 12 resin, 10% by weight of an impact resistance improver and 5% by weight of a plasticizer.

(F) Adhesive resin: The modified polyolefin resin (UBond F1100 made by the Ube Industries, Ltd.).

Examples 1 to 4

After blending the (D) polyamide 6 resin described above with a predetermined amount of the fine carbon fiber produced in a similar manner to the production example A, and preliminarily mixing them by the Henschel mixer, the blend was melted and kneaded at 260° C. by a double screw melting kneader, and the molten kneaded product was pelletized to obtain the electroconductive polyamide resin composition (D-1). Table 1 shows the blending amount of the fine carbon fiber in respective Examples.

Then by using the resultant electroconductive resin composition (D-1), the (F) adhesive resin and the (E) polyamide 12 resin, (D-1) at an extrusion temperature of 270° C., (F) at an extrusion temperature of 190° C. and (E) at an extrusion temperature of 250° C. were separately melted by a three layer tube molding machine, Plabor (made by the Research Laboratory of Plastics Technology Co., Ltd.), and the molten resins discharged were joined by means of an adapter to mold a multilayer tubular article. Subsequently, the article was cooled down by a sizing die controlling dimensions and withdrawn to obtain a multilayer tube with an inner diameter of 6 mm and an outer diameter of 8 mm and a layer structure of (a)/(b)/(c)=0.10/0.05/0.85 mm given that the (a) layer consists of the electroconductive polyamide 6 resin composition (D-1) (inner layer), the (b) layer consists of the (F) adhesive resin (adhesion layer) and the (c) layer consists of the (E) polyamide 12 resin (outer layer). Table 1 shows the measurement results of physical properties of the multilayer tube.

Comparative Examples 1 to 2

Evaluation was made in a similar manner to the Examples 1 to 4 except that (D-1) was replaced with the polyamide resin composition (D-2) wherein the Ketjen Black (EC600JD made by the Ketjen Black International Co.) was melted and mixed in place of the fine carbon fiber. The results are shown in Table 1 together with the blending compositions.

resin composition (B-2) wherein the Ketjen Black (EC600JD made by the Ketjen Black International Co.) was melted and mixed in place of the fine carbon fiber. The results are shown in Table 2.

TABLE 1

|  |  | Unit | Ex. 1 | Ex. 2 | Ex. 3 | Ex. 4 | Comp. Ex. 1 | Comp. EX. 2 |
|---|---|---|---|---|---|---|---|---|
| Inner layer | Resin composition |  | D-1 | | | | 50 D-2 | |
| | Thermoplastic resin used | | D | D | D | D | D | D |
| | Blending amount of the fine carbon fiber | % by mass | 1.5 | 1.0 | 3.0 | 5.0 | | |
| | Blending amount of the Ketjen Black | % by mass | | | | | 1.5 | 5.0 |
| | Surface specific resistivity | Ω/□ | $1 \times 10^5$ | $7 \times 10^6$ | $9 \times 10^3$ | $9 \times 10^2$ | $5 \times 10^{10}$ | $1 \times 10^5$ |
| Adhesion layer | Thermoplastic resin used | | F | F | F | F | F | F |
| Outer layer | Thermoplastic resin used | | E | E | E | E | E | E |
| | Tube moldability | | ○ | ○ | ○ | ○ | △ | X |
| Mechanical strength | Tensile elongation | % | 250 | 260 | 220 | 180 | 100 | 70 |
| | Impact resistance at low temperature | Number of breaking/ number of testing | 0/10 | 0/10 | 0/10 | 5/10 | 1/10 | 7/10 |
| | Fracture pressure strength | MPa | 7.5 | 7.5 | 7.7 | 7.8 | 7.5 | 7.7 |
| Fuel resistance | Holding ratio of tensile elongation | % | ≥75 | ≥75 | ≥75 | ≥75 | ≥75 | ≥75 |
| | Impact resistance at low temperature | Number of breaking/ number of testing | 0/10 | 0/10 | 0/10 | 4/10 | 1/10 | 7/10 |
| | Fracture pressure strength | MPa | 8.3 | 8.3 | 8.5 | 8.6 | 8.3 | 8.5 |

Example 5

After blending the polyamide resin of the production example B described above with a predetermined amount of the fine carbon fiber produced in a similar manner to the production example A, and preliminarily mixing them by the Henschel mixer, the blend was melted and kneaded at 270° C. by a double screw melting kneader, and the molten kneaded product was pelletized to obtain the electroconductive polyamide resin composition (B-1).

Then by using the resultant electroconductive polyamide resin composition (B-1), the (F) adhesive resin and the (E) polyamide 12 resin, (B-1) at an extrusion temperature of 280° C., (F) at an extrusion temperature of 190° C. and (E) at an extrusion temperature of 250° C. were separately melted by a three layer tube molding machine, Plabor (made by the Research Laboratory of Plastics Technology Co., Ltd.), and the molten resins discharged were joined by means of an adapter to mold a multilayer tubular article. Subsequently, the article was cooled down by a sizing die controlling dimensions and withdrawn to obtain a multilayer tube with an inner diameter of 6 mm and an outer diameter of 8 mm and a layer structure of (a)/(b)/(c)=0.10/0.05/0.85 mm given that the (a) layer consists of the electroconductive polyamide resin composition (B-1) (inner layer), the (b) layer consists of the (F) adhesive resin (adhesion layer) and the (c) layer consists of the (E) polyamide 12 resin (outer layer). Table 2 shows the measurement results of physical properties of the multilayer tube.

Comparative Examples 3 to 4

Evaluation was made in a similar manner to the working example 5 except that (B-1) was replaced with the polyamide

Example 6

After blending the polyamide resin of the production example C described above with a predetermined amount of the fine carbon fiber produced in a similar manner to the production example A, and preliminarily mixing them by the Henschel mixer, the blend was melted and mixed at 320° C. by a double screw extruder, and the molten mixture was pelletized to obtain the electroconductive polyamide resin composition (C-1).

Then by using the resultant electroconductive polyamide resin composition (C-1) and the (E) polyamide 12 resin, (C-1) at an extrusion temperature of 310° C. and (E) at an extrusion temperature of 250° C. were separately melted by a two layer tube molding machine, Plabor (made by the Research Laboratory of Plastics Technology Co., Ltd.), and the molten resins discharged were joined by means of an adapter to mold a multilayer tubular article. Subsequently, the article was cooled down by a sizing die controlling dimensions and withdrawn to obtain a multilayer tube with an inner diameter of 6 mm and an outer diameter of 8 mm and a layer structure of (a)/(b)=0.10/0.90 mm given that the (a) layer consists of the electroconductive polyamide resin composition (C-1) (inner layer) and the (b) layer consists of the (E) polyamide 12 resin (outer layer). Table 2 shows the measurement results of physical properties of the multilayer tube.

Comparative Examples 5 to 6

Evaluation was made in a similar manner to the Example 6 except that (C-1) was replaced with the polyamide resin composition (C-2) wherein the Ketjen Black (EC600JD made by the Ketjen Black International Co.) was melted and mixed in place of the fine carbon fiber. The results are shown in Table 2.

TABLE 2

| | | Unit | Ex. 5 | Ex. 6 | Comp. Ex. 3 | Comp. Ex. 4 | Comp. Ex. 5 | Comp. Ex. 6 |
|---|---|---|---|---|---|---|---|---|
| Inner layer | Resin composition | | B-1 | C-1 | B-2 | B-2 | C-2 | C-2 |
| | Thermoplastic resin used | | B | C | B | B | C | C |
| | Blending amount of the fine carbon fiber | % by mass | 1.5 | 1.5 | | | | |
| | Blending amount of the Ketjen Black | % by mass | | | 1.5 | 5.0 | 1.5 | 5.0 |
| | Surface specific resistivity | Ω/□ | $9 \times 10^4$ | $2 \times 10^5$ | $9 \times 10^{11}$ | $1 \times 10^4$ | $1 \times 10^{12}$ | $1 \times 10^4$ |
| Adhesion layer | Thermoplastic resin used | | F | | F | F | | |
| Outer layer | Thermoplastic resin used | | E | E | E | E | E | E |
| | Tube moldability | | ○ | ○ | Δ | X | Δ | X |
| Mechanical strength | Tensile elongation | % | 250 | 220 | 63 | 45 | 60 | 38 |
| | Impact resistance at low temperature | Number of breaking/ number of testing | 0/10 | 0/10 | 1/10 | 9/10 | 1/10 | 8/10 |
| | Fracture pressure strength | MPa | 8.5 | 8.5 | 8.5 | 8.8 | 8.5 | 8.7 |
| Fuel resistance | Holding ratio of tensile elongation | % | ≥75 | ≥75 | ≥75 | ≥75 | ≥75 | ≥75 |
| | Impact resistance at low temperature | Number of breaking/ number of testing | 0/10 | 0/10 | 1/10 | 9/10 | 1/10 | 6/10 |
| | Fracture pressure strength | MPa | 8.5 | 8.6 | 8.5 | 8.8 | 8.6 | 8.8 |

As shown in the Examples and the Comparative examples of Table 1 and Table 2, the multilayer tube using the fine carbon fiber characterizing the present invention excels in the moldability and further excels in the tensile elongation and the impact resistance at low temperature more than those using the Ketjen Black.

INDUSTRIAL USABILITY

The multilayer tube of the present invention has a stable electroconductivity in its inner layer and enables prevention of explosion owing to static electricity generated upon transporting a fluid such as a fuel, a chemical liquid or a gas. Since further the tube is excellent in a property of preventing the permeation of a fuel, a chemical liquid or a gas at a high temperature and in a heat resistance, it is useful as a tube for transporting a fuel, a chemical liquid or a gas used at a high temperature. The multilayer tube of the present invention is useful in particular as an engine coolant (LLC: Long Life Coolant) hose, a gasoline hose, a diesel hose, an oil drilling hose, a hose for gasoline containing an alcohol, a hose for transporting a urea solution, a heater hose, a reservoir tank hose, a road heating hose and a floor heating hose, which are intended for use in severe conditions.

DESCRIPTION OF SYMBOLS

11 structural unit
12 head-top part
13 body-part
21, 21*a*, 21*b*, 21*c* aggregate

The invention claimed is:

1. A multilayer tube for transporting a fuel, a chemical liquid or a gas, the multilayer tube comprising at least two layers of
   (a) an outer layer comprising a thermoplastic resin, and
   (b) an inner layer comprising an electroconductive thermoplastic resin so that a surface resistivity is not more than $10^8$ Ω; the electroconductive thermoplastic resin comprising a fine carbon fiber, wherein a graphite-net plane consisting solely of carbon atoms forms a temple-bell-shaped structural unit comprising closed head-top part and body-part with open lower-end where an angle θ formed by a generatrix of the body-part and a fiber axis is less than 15°, 2 to 30 of the temple-bell-shaped structural units are stacked sharing a common central axis to form an aggregate having an aspect ratio L/D of 2 to 30 wherein D is an outer diameter the body-part and L is a length of the aggregate, and the aggregates are connected in head-to-tail style with a distance by van der Waals force to form the fiber.

2. The multilayer tube for transporting a fuel, a chemical liquid or a gas according to claim 1, wherein the fine carbon fiber is produced by vapor phase growth using a catalyst containing an element selected from the group consisting of Fe, Co, Ni, Al, Mg and Si, and an ash content in the fine carbon fiber is 4% by weight or less.

3. The multilayer tube for transporting a fuel, a chemical liquid or a gas according to claim 1, wherein the fine carbon fiber is a fine short carbon fiber in which 100 or less of the aggregates are connected.

4. The multilayer tube for transporting a fuel, a chemical liquid or a gas according to claim 1, wherein the fine short carbon fibers are produced by fiber shortening by applying shear stress.

5. The multilayer tube for transporting a fuel, a chemical liquid or a gas according to any one of claim 1, wherein the thermoplastic resin constituting the outer layer is a polyamide.

6. The multilayer tube for transporting a fuel, a chemical liquid or a gas according to any one of claim 1, wherein the electroconductive thermoplastic resin constituting the inner layer is an electroconductive polyamide.

7. The multilayer tube for transporting a fuel, a chemical liquid or a gas according to claim 1, wherein the electroconductive thermoplastic resin constituting the inner layer is an electroconductive polyamide resin comprising a polyamide obtained from a dicarboxylic acid component comprising oxalic acid and a diamine component comprising a diamine having 4 to 12 carbon atoms.

8. The multilayer tube for transporting a fuel, a chemical liquid or a gas according to claim 1, wherein the electroconductive thermoplastic resin constituting the inner layer is a polyamide resin obtained by using a diamine component consisting substantively of 1,9-nonanediamine and 2-methyl-1,8-octanediamine, in which a molar ratio of 1,9-nonanediamine and 2-methyl-1,8-octanediamine is from 1:99 to 99:1.

* * * * *